June 26, 1923.
R. P. BROWN
1,459,821
CONTROL APPARATUS
Filed March 14, 1921  2 Sheets-Sheet 1
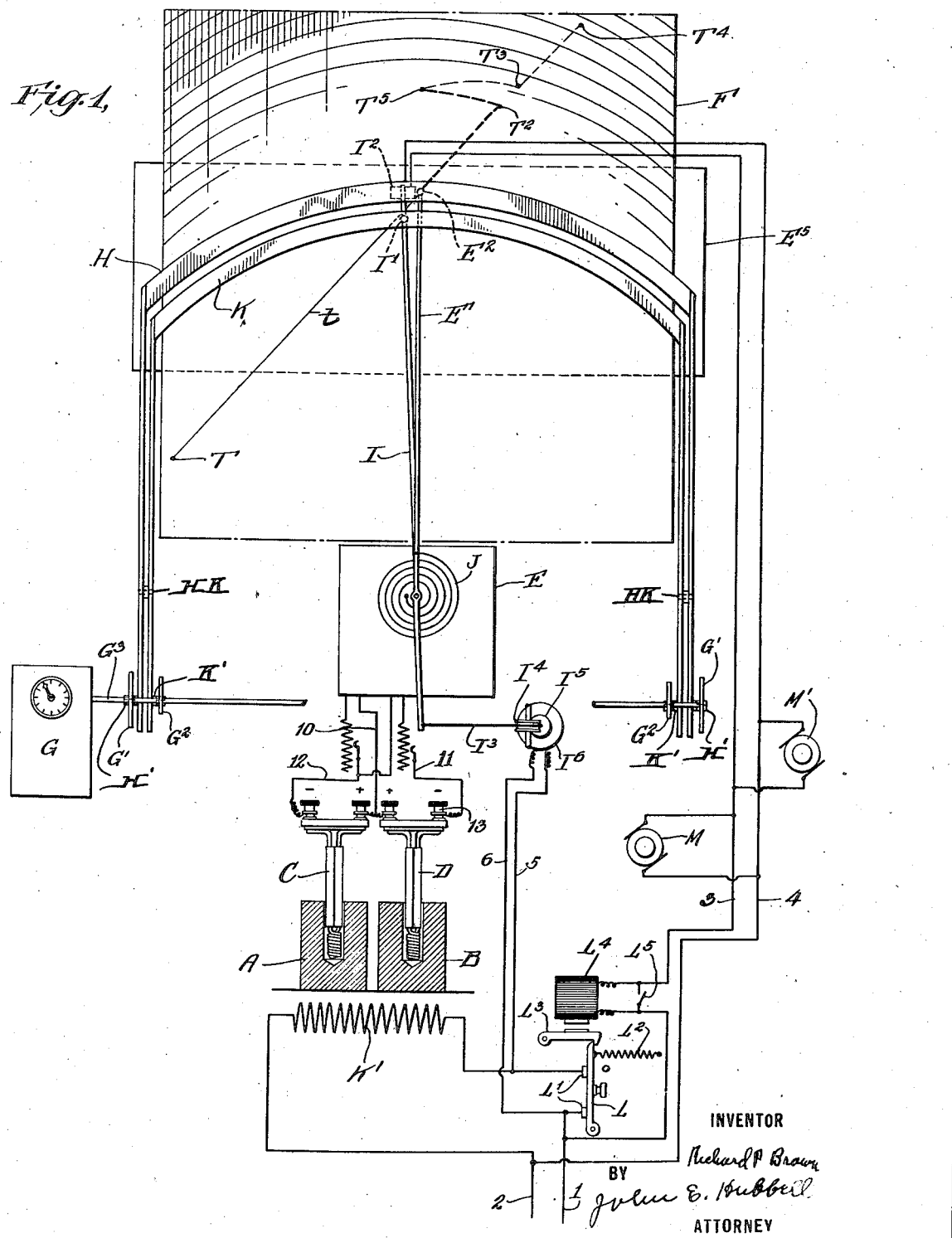

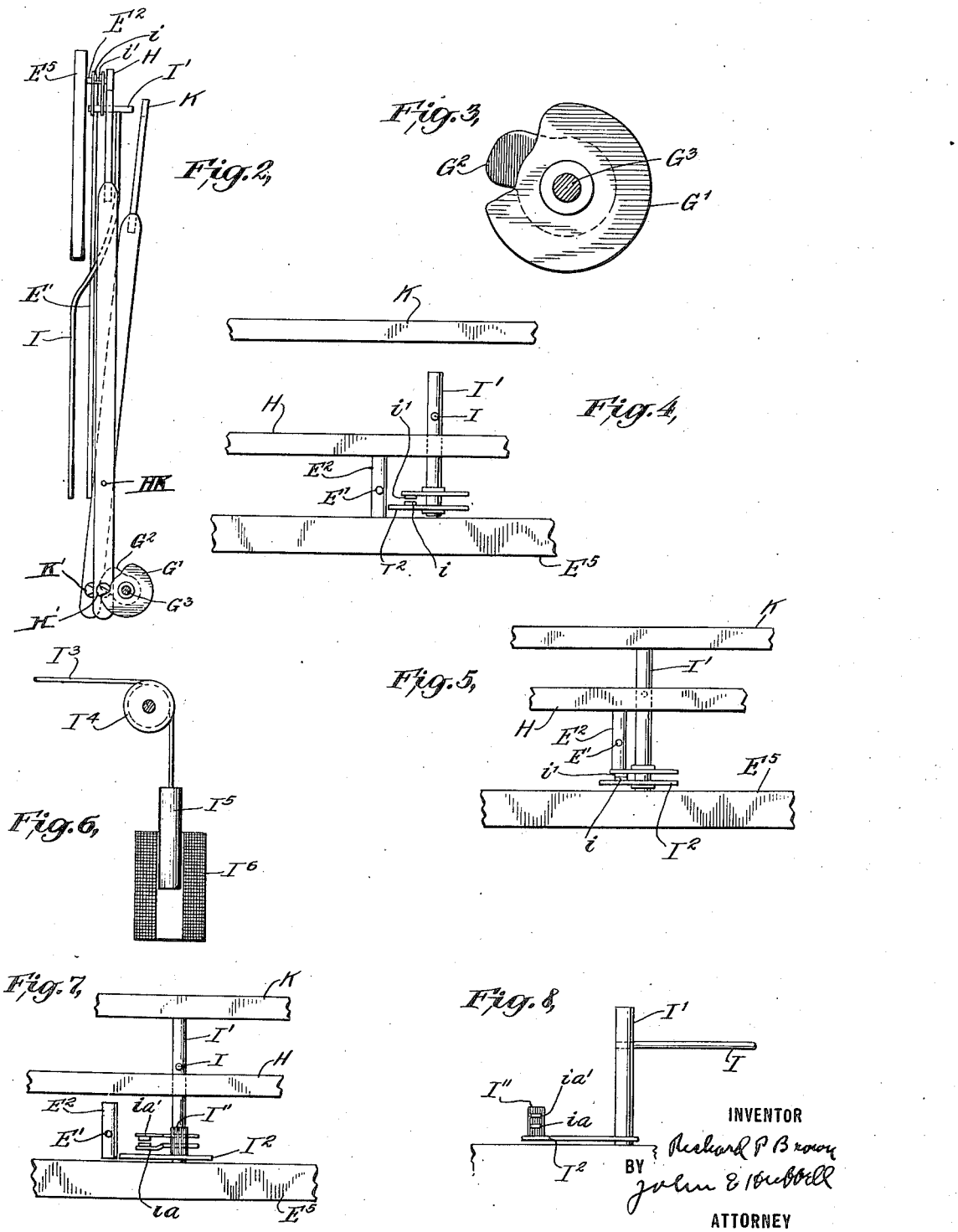

Patented June 26, 1923.

1,459,821

UNITED STATES PATENT OFFICE.

RICHARD P. BROWN, OF PHILADELPHIA, PENNSYLVANIA, ASSIGNOR TO BROWN INSTRUMENT COMPANY, OF PHILADELPHIA, PENNSYLVANIA, A CORPORATION OF PENNSYLVANIA.

CONTROL APPARATUS.

Application filed March 14, 1921. Serial No. 452,077.

*To all whom it may concern:*

Be it known that I, RICHARD P. BROWN, citizen of the United States, and resident of Philadelphia, in the county of Philadelphia and State of Pennsylvania, have invented certain new and useful Improvements in Control Apparatus, of which the following is a specification.

When, as in the so-called heat treatment of steels, heat is imparted to or abstracted from a body undergoing such treatment, the temperature of the body varies with the rate of heat absorption or cooling except at so-called transformation points or temperatures at which the body absorbs or gives up heat without a corresponding change in temperature. In certain heat treatment operations it is highly desirable that the rate at which heat is supplied to or absorbed from the body undergoing the treatment should be interrupted or modified as soon as, or very shortly after the transformation temperature is reached. Such a transformation temperature cannot ordinarily be accurately foretold even when the composition of the body undergoing the heat treatment is well known.

The general object of the present invention is to provide for the automatic and positive actuation of a control device, such as the lighting of a signal lamp, the sounding of a bell or the adjustment of a valve or switch controlling or regulating the supply of heat to, or its abstraction from the body undergoing treatment when the latter reaches the transformation temperature. For this purpose I operatively associate with the control device means, responsive to variations in the relation between the rate at which the body absorbs heat or cools and the corresponding change in its temperature, for actuating the control device on the variation in such relation occurring when the body passes through the transformation point. Instruments for indicating or recording thermal changes in bodies undergoing heat treatment have been devised to show by the movements of the instrument needle or indicating arm, or by the record of such movements made on a record sheet, the passage of the body undergoing treatment through the tranformation temperature but I believe that I am the first to provide for the automatic actuation of a control device such as a lamp, bell, or heat regulating valve or switch when the transformation point is reached. As compared with an instrument which merely indicates or records the transformation temperature, the apparatus forming the subject of the present invention possesses important practical advantages in that it reduces possibilities of error and reduces the attention required from the operator in charge of the heat treating operation. Even where there is no automatic control of the supply of heat or of the rate of cooling, the automatic lighting of a lamp or sounding of a bell, made possible by the use of the present invention, reduces very materially the attention which the operator must give to any one heat treating operation, and makes it possible for him to simultaneously carry out more heat treating operations than is possible with the indicating or recording apparatus heretofore employed.

The various features of novelty which characterize my invention are pointed out with particularity in the claims annexed to and forming a part of this specification. For a better understanding of the invention, however, and advantages possessed by it, reference should be had to the accompanying drawings and descriptive matter in which I have illustrated and described a preferred embodiment of the invention.

Of the drawings:

Fig. 1 is a diagrammatic representation of heat treating apparatus including automatically actuated transformation indicating signals and automatic provisions for cutting off the supply of heat to the furnace when the transformation point is reached;

Fig. 2 is an elevation of a portion of the apparatus shown diagrammatically in Fig. 1;

Fig. 3 is a diagrammatic representation of cams shown in Fig. 2;

Fig. 4 is an elevation taken at right angles to Fig. 2 illustrating a portion of the mechanism shown therein;

Fig. 5 is a view taken similarly to Fig. 4 showing the parts in a different operating position;

Fig. 6 is an elevation of another detail of construction employed in the apparatus shown;

Fig. 7 is a view taken similarly to Fig. 4 illustrating a modified construction, and Fig. 8 is an elevation taken at right angles to Fig. 7.

The particular form of embodiment of my invention illustrated in the drawings comprises means for responding to the thermal condition of the body undergoing heat treatment and for automatically actuating a control device when the body reaches a transformation temperature similar to that shown in my prior patent No. 1,189,785. This apparatus includes a differential recording instrument E connected to the terminals of pyrometers associated respectively with a body A undergoing heat treatment and a neutral body B subjected to the same thermal conditions as the body A as in my said prior patent. With such apparatus the temperatures of the bodies A and B will be equal at all times except when the body A is passing through a transformation temperature. While the bodies A and B are at the same temperature the instrument needle E' will indicate or record their common temperature accurately, but when the body A passes through a transformation temperature and then differs in temperature from the body B, the needle E' is sharply deflected and thus gives an easily read indication of the passage of the body A through the transformation point. As the bodies A and B are heated up from an initial temperature T to a final temperature $T^4$ instrument needle E' will trace on a suitable record sheet F a curve $t$ running across the record sheet more or less uniformly in the same general direction while the temperature of the body A rises from the temperature T to the transformation temperature indicated at $T^2$. When this temperature is reached and the body A temporarily ceases to increase in temperature while the body B continues to rise, a sharp retrograde deflection of the instrument needle from the point $T^2$ to the point $T^5$ occurs. From the point $T^5$ the needle swings back to the point $T^3$ at which the temperature of the body A again commences to vary as does the temperature of the body B.

The recording apparatus shown in Fig. 1 comprises a boom or depressor H which intermittently depresses the head $E^2$ of the arm E' into contact with the record sheet F as the latter is moved over the table or record supporting bed $E^5$. Except when thus depressed, the arm E' swings clear of the record sheet and is not subjected to frictional contact therewith. As shown the depressor H is intermittently actuated by cams G' carried by a shaft $G^3$ which is revolved at a uniform rate by a suitable device such as the clock motor G.

In adapting the apparatus just described for use in carrying out the present invention I associate with the instrument E, an arm I advantageously pivoted to turn about the same axis as the instrument arm E', and I give the arm I a tendency to swing in the same direction as the arm E' swings in passing from the point T to the point $T^4$ by suitable provisions which as shown comprises the hair spring J. Cooperating with the arm I is a second depressor K which intermittently engages the head I' carried at the free end of the arm I and clamps it against the table or supporting bed $E^5$ of the instrument. The depressor K is intermittently actuated by the cams $G^2$ also carried by the clock motor shaft $G^3$. As shown, the depressors H and K are each of U shape and have their legs pivotally connected at HK to a suitable support. The free end of each leg of the depressor H carries a laterally projecting pin H' which extends across the plane of the corresponding cam G'. As the cams G' are rotated the high portion of the periphery of each cam engages the corresponding pin H' and thereby the front end of the depressor. This releases the head $E^2$ of the instrument arm E'. When the continued rotation of the cams G' brings the low portions of the cams immediately above the pins H', the front end of the depressor H is permitted to lower under its own weight and then clamps the head $E^2$ of the instrument arm E' against the bed of the machine. The free ends of the arms of the depressor K carry laterally projecting pins K' which extend across the planes of the cams $G^2$ and the latter raise the front end of the depressor K and permit it to fall back, thus releasing and engaging the head I' of the member I in exactly the same manner as the cams G' act through the depressor H on the head $E^2$ of the instrument arm E'. The cams G' and $G^2$ are so shaped, as is best shown in the diagram of Fig. 3, that the arm I will normally be held stationary by its depressor K while the arm E' is normally free, the depressor K being raised and the arm I freed only during the short intervals in which the depressor H clamps the head $E^2$ of the arm E' against the bed of the machine.

During the relatively short intervals in which the depressor H clamps the head of the arm E' against the record support $E^5$ and the arm I is released by the depressor K, the arm I is free to swing under the action of the spring J into the position in which the portion $I^2$ of the head I' engages the clamped head $E^2$ of the instrument arm E' and its motion is thereby arrested. So long as the instrument arm E' swings progressively from left to right as seen at Fig. 1, the arm I thus normally follows the arm E' step by step. On a retrograde movement of the instrument arm E' from right to left, the head E² when freed by the elevation of the depressor H swings over the projection I², and when the retrograde movement is sufficient, over the contact member i'', and when the depressor H next bears down on the head E² it thereby clamps the latter and also the arm I to the instrument E⁵. In consequence, when the depressor K is next elevated the arm I is not free to move. When the depressor H is next elevated, however, the arm E² is free to swing either to the right, or to the left until its motion is arrested by its engagement with the head I' of the arm I.

As shown the projection I² carries a contact i beneath the contact i'', the latter being normally spring held out of engagement with the contact i. When the depressor H is lowered with the instrument arm E² above the contact member i'', the latter is caused to engage the contact i and thereby close an electric circuit energizing one or more control devices. In the apparatus shown diagrammatically in Fig. 1, K' represents the heating resistance element of an electric resistance furnace in which the body A is subjected to its heat treatment. The terminals of the resistance K are connected to the supply conductors 1 and 2. The supply conductor 1 includes a pair of switch contacts L' and a switch member L for connecting these contacts. As shown the switch member L is normally latched in the closed position by the armature L³ of an electric magnet L⁴, and a spring L² tends to open the switch L when the magnet L⁴ is energized. As shown the magnet L⁴ is connected in a circuit including conductors 3 and 4 and the contact i and i''. M represents a signaling device which may be a lamp, and M' represents a second signaling device which may be a buzzer or other form of audible annunciator. The closure of the contacts i and i'' energizes the electromagnet L⁴ and thereby opens the switch L and interrupts the supply of heat to the furnace. The closure of the contacts i and i'' also lights the lamps M, sounds the buzzer M' and actuates any other control device which may be connected in circuit with the contacts i and i''.

To return the arm I to its normal position when the switch L is opened I connect an armature I⁵ to one end of the arm I by a cord or other flexible element I³ running over a pulley I⁴ as shown in Fig. 6 and in conjunction with the armature I⁵ provide a solenoid coil I⁶ connected by conductors 5 and 6 to the supply conductor 1 at opposite sides of the switch contact L'. With this arrangement the coil I⁶ is energized and swings the arm I to the left when the switch L is opened.

In the modification shown in Figs. 7 and 8 the contacts ia and ia', pass through, and are frictionally held in sockets in a post I'' mounted on the projection I² from the head I' of the arm I, so that they may be adjusted toward and away from the free end of the projection I².

With this arrangement the extent of retrograde movement of the instrument arm E' necessary to effect an actuation of the control devices may be varied. This is desirable in some cases where the supply of heat to the furnace should be interrupted only after the body A has been subjected for a brief interval varying with conditions to the transformation temperature.

To adapt the apparatus shown in the drawings for use in a heat treatment involving a cooling down rather than a heating up of the body undergoing treatment would require an inversion of parts in which the arm I is located at the right instead of at the left of the instrument arm E' and is given a tendency to swing to the left instead of to the right.

It will be apparent of course that the thermally responsive instrument need not be a recording instrument nor even an indicating instrument to enable it to perform its function of positively actuating a control device when the object underdoing heat treatment reaches a transformation temperature. It will also be apparent to those skilled in the art that other forms of apparatus responsive to the thermal condition of the body undergoing heat treatment may be employed to actuate a control device when the transformation point is reached. In particular, the use of a neutral body B may be dispensed with in the heat treatment of certain steel where the variance between the rate of heat absorption or cooling and the corresponding rate of temperature change is relatively wide at the transformation temperature. When desirable in some cases, it is not essential to embed the one thermo couple in the neutral body if the latter is used, or to have the other thermo couple inserted in or even in actual contact with the body undergoing heat treatment. In heat treating a group of gears, for example, the one pyrometer thermo-couple may be inserted in the group of gears or in close proximity thereto, while the other pyrometer thermo-couple may be placed in the furnace chamber near its wall.

The particular means shown for closing an electric current or otherwise actuating a signal or other control device on the retrograde movement of an instrument needle is simple and effective and possesses the desirable characteristic that it is applicable to a very sensitive instrument as it puts no load frictional or otherwise upon the instrument needle, and this novel feature of my invention is susceptible of other uses than the particular one disclosed, but this arrangement while a desirable one need not necessarily be employed in apparatus for automatically actuating a control device when a body undergoing heat treatment reaches a transformation temperature.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims and that certain features of my invention may sometimes be used to advantage without the corresponding use of other features.

Having now described my invention, what I claim as new and desire to secure by Letters Patent, is:

1. Apparatus for subjecting a body to heat treatment comprising in combination thermometric means responsive to the relation between the rate at which heat is being absorbed or given off by the body undergoing heat treatment and the corresponding change in temperature of the body and a control device actuated by said means on the variation in said relation occurring when the body passes through a transformation point.

2. Apparatus for subjecting a body to heat treatment comprising in combination thermometric means responsive to the relation between the rate at which heat is being absorbed or given off by the body undergoing heat treatment and the corresponding change in temperature of the body and a signaling device actuated by said means on the variation in said relation occuring when the body passes through a transformation point.

3. Apparatus for subjecting a body to heat treatment comprising in combination a furnace for heating the body, thermometric means responsive to the relation between the rate at which heat is being absorbed or given off by the body undergoing heat treatment and the corresponding change in temperature of the body and a furnace regulator actuated by said means on the variation in said relation occurring when the body passes through a transformation point.

4. Apparatus for subjecting a body to heat treatment comprising thermometric means responsive to the relation between the rate at which heat is being absorbed or given off by the body undergoing heat treatment and the corresponding change in temperature of the body and including an element movable in one direction on a change in one direction of the temperature of said body while said relation remains approximately constant, and moved in the reverse direction by a change in said relation.

5. Apparatus for subjecting a body to heat treatment comprising means responsive to the relation between the rate at which heat is being absorbed or given off by the body undergoing heat treatment and the corresponding change in temperature of the body and including an element moving in one direction on a change in one direction of the temperature of said body while said relation remains constant and moved in the opposite direction by a change in said relation when the temperature of said body remains approximately constant, and circuit closing means actuated by a movement of said member in said reverse direction.

6. The combination with an instrument needle movable back and forth along an extended path in response to changes in a quantity being measured, of current closing means actuated by a small needle movement in one direction only from any point along said path of movement.

7. The combination with an instrument needle movable back and forth along an extended path in response to changes in a quantity being measured of current closing means actuated by a small needle movement in one direction from any point along said path of movement, and means for adjusting the extent of needle movement necessary to actuate said circuit closing means.

8. The combination with an instrument needle movable back and forth along a path of movement in response to changes in a quantity being measured, of an element tending to follow the needle in the movement of the latter in one direction only, and means responsive to the relative positions of said needle and element and actuated by the change in relative position of said needle and element produced by a movement of said needle in a direction opposite to that in which said element tends to move.

9. The combination with an instrument needle tending to move back and forth along a path of movement in response to changes in a quantity being measured, of means for periodically holding said needle stationary, a device tending to follow said needle in its movements in one direction and adapted to engage and may be arrested by said needle when the latter is held against movement, and means for holding said device against movement during the intervals in which the needle is free to move.

10. The combination with an instrument needle movable back and forth over a path of movement according to changes in one direction or the other of a quantity being measured, of control means automatically actuated by a small movement of said needle in one direction only from any point along its path of movement.

11. The combination with an instrument needle moving in one direction or the other in response to increases or decreases in a quantity being measured, of an element tending to follow said needle and control means actuated by said element and needle on a reverse movement of the latter.

Signed at Philadelphia in the county of Philadelphia and State of Pennsylvania this 8 day of March A. D. 1921.

RICHARD P. BROWN.